E

(12) United States Patent
Johansson et al.

(10) Patent No.: US 8,472,421 B2
(45) Date of Patent: Jun. 25, 2013

(54) METHOD AND SYSTEM FOR AVOIDING HANGING PDP CONTEXTS

(75) Inventors: Kaj Olof Inge Johansson, Mölndal (SE); Per Svedberg, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 81 days.

(21) Appl. No.: 13/182,595

(22) Filed: Jul. 14, 2011

(65) Prior Publication Data

US 2011/0268042 A1  Nov. 3, 2011

Related U.S. Application Data

(63) Continuation of application No. 12/107,503, filed on Apr. 22, 2008, now Pat. No. 8,077,685.

(60) Provisional application No. 60/913,722, filed on Apr. 24, 2007.

(51) Int. Cl.
*H04W 4/00* (2009.01)

(52) U.S. Cl.
USPC .......... 370/338; 455/403; 455/422.1

(58) Field of Classification Search
USPC .......... 370/310–350; 455/403, 422.1–460
See application file for complete search history.

(56) References Cited

U.S. PATENT DOCUMENTS

| 5,638,372 | A | 6/1997 | Lindqvist | |
| 2003/0153309 | A1* | 8/2003 | Bjelland et al. | 455/432 |
| 2004/0215794 | A1* | 10/2004 | Lauer | 709/230 |
| 2005/0265382 | A1 | 12/2005 | Hartikainen | |
| 2006/0036741 | A1* | 2/2006 | Kiss et al. | 709/227 |
| 2007/0064709 | A1* | 3/2007 | Holmstrom et al. | 370/395.2 |
| 2007/0124160 | A1* | 5/2007 | Duan et al. | 705/1 |
| 2008/0089250 | A1* | 4/2008 | Jung | 370/276 |
| 2009/0303971 | A1* | 12/2009 | Kim et al. | 370/338 |

FOREIGN PATENT DOCUMENTS

WO    WO 03/013165 A1    2/2003

OTHER PUBLICATIONS

Digital cellular Telecommunications System (Phase 2+); Universal Mobile Telecommunications System (UMTS); General Packet Radio Service (GPRS); GPRS Tunnelling Protocol (GTP) Across the Gn and Gp Interface (3GPP TS 29.060 v7.5.1 Release 7). ETSI TS 129 060 v7.5.1. Mar. 1, 2007.

Ericsson. Discussion Paper on Correction to Reduce Number of Hanging PDP Contexts in GGSN. 3GPP TSG CN WG4 Meeting #20, N4-030854. Aug. 29, 2003.

* cited by examiner

*Primary Examiner* — Charles C Jiang

(57) ABSTRACT

A method and system for avoiding hanging Packet Data Protocol (PDP) contexts in a General Packet Radio Service (GPRS) network. A time-out period is included in a request message to create a PDP context. The request message is transmitted from a first GPRS Support Node (GSN) to a second GSN. The second GSN receives the request message and transmits a response message to the first GSN. If the second GSN is unable to create the PDP context within the time-out period, the response message informs the first GSN that creation of the PDP context has been aborted. A Network Service Access Point Identifier (NSAPI) may be included in the response message so that the first GSN may request the second GSN to delete the request for creating the PDP context after a N3-T3 timeout of the first GSN has expired.

7 Claims, 3 Drawing Sheets

METHOD AND SYSTEM FOR AVOIDING HANGING PDP CONTEXTS

CROSS-REFERENCE TO RELATED APPLICATIONS

This application is a continuation of co-pending U.S. patent application Ser. No. 12/107,503 filed on Apr. 22, 2008, now U.S. Pat. No. 8,077,685, which claims the benefit of U.S. Provisional Application No. 60/913,722, filed on Apr. 24, 2007, the disclosures of which are incorporated herein in their entireties by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to a method and system for avoiding hanging Packet Data Protocol (PDP) contexts in a General Packet Radio Service (GPRS) network.

In the 2G/3G packet switched technology that is enabling Mobile Internet, session management is one of the main functionalities.

The packet switched core network functions are split up in two different nodes, namely SGSN (Serving GPRS Support Nodes) and GGSN (Gateway GPRS Support nodes), which together form the GSN (GPRS Support Nodes).

Between these two entities, the GTPv1 (GPRS Tunneling Protocol version 1) protocol is used for creation and management of the user sessions requested by the end users.

The GTPv1 protocol is on top of UDP/IP (User Datagram Protocol/Internet Protocol). As UDP is a connectionless protocol, it leaves to the application to take care of the handshake that a request has been successfully delivered, i.e., a response will be sent back by the receiver of a request message to the sender of the request.

In the GTPv1 protocol, a retransmission mechanism is specified to take into account that a request message may get lost on its way to a GSN peer due to disturbance on the communication line.

The mechanism is simply a maximum number of retries and the wait time between each transmission attempt. This is called the N3-T3 timeout. In normal implementations of the GTP stack, these parameters are configurable to make it possible for the operators to adjust the SGSN as well as the GGSN for the different GPRS procedures specified within 3GPP ($3^{rd}$ Generation Partnership Project).

At the detection of a N3-T3 timeout, the SGSN may delete all PDP (Packet Data Protocol) contexts associated with the failed path. Consequently, it is important that the GGSN responds in time in order to avoid path failure in the SGSN. A timer is started for each received request in the GGSN, and this timer controls when to abort the procedure and respond back to the SGSN. The operator configures how long this timer should be and this is of course correlated with the N3-T3 tinier in the SGSN.

Without the timer, the GGSN would potentially end up with hanging PDP contexts, for example, if the SGSN times out on N3-T3 and rejects the context and then shortly after receives a create PDP context response from the GGSN.

A SGSN will be in contact with multiple GGSNs in its own PLMN (Public Land Mobile Network) but also with a number of GGSN peers located in other PLMNs. Thus, it is not possible to set an optimal N3 and T3 value respectively to fit all GGSNs and their surrounding networks.

A problem occurs when the GGSN part of the creation procedure of a PDP context takes longer time due to temporary congestion (e.g., waiting for a response from an external node such as RADIUS (Remote Access Dial-In Server) servers, PCRFs (Policy Control and Charging Rules Function), etc.) than what is configured for the N3-T3 timeout in the SGSN requesting the creation.

The outcome of this will be that the SGSN will detect a request timeout before the procedure is concluded in the GGSN. At the time out, the SGSN will either reject the PDP context creation or try with another, redundant GGSN. And, finally, when the GGSN completes the PDP context creation and sends a successful creation response back to the SGSN, the SGSN will simply ignore the response (this is stated in the GTP standard). This will then lead to a hanging PDP context in the GGSN.

For example, as shown in FIG. 1, a SGSN 110 with an N3-T3 timeout of 8 seconds may send a "Create PDP Context Request" message 120 to a GGSN 130. If the GGSN 130 does not respond with a "Create PDP Context Response" message 140 within the 8 seconds, the SGSN 110 will either reject the PDP context creation or send a "Create PDP Context Request" message 150 to another, redundant GGSN. If, as shown in FIG. 1, the GGSN 130 responds with the "Create PDP Context Response" message 140 after 10 seconds, for example, the SGSN 110 will ignore the response, thereby resulting in a hanging PDP context in the GGSN 130.

Furthermore, it is not possible for the SGSN 110 to send a "Delete PDP Context Request" message to the GGSN 130 when the N3-T3 timer expires, as the SGSN 110 needs the TEID (Tunnel Endpoint Identifier) allocated by the GGSN 130 for that. This information, however, is included in the "Create PDP Context Response" message 140 from the GGSN 130.

In the related art, an SGSN may behave as follows when the SGSN detects path failure (N3-T3): for Echo request timeouts, the SGSN will only generate an alarm; for Create requests, the SGSN will reject the create request or, alternatively, try another GGSN; and for Update/Delete requests, the SGSN will delete the PDP context.

BRIEF SUMMARY OF THE INVENTION

The present invention, in exemplary embodiments, overcomes the above disadvantages and other disadvantages not described above. Also, the present invention is not required to overcome the disadvantages described above, and an exemplary embodiment of the present invention may not overcome any of the problems described above.

Thus, in one aspect, the present invention is directed to a method for avoiding hanging Packet Data Protocol (PDP) contexts in a General Packet Radio Service (GPRS) network. A time-out period is included in a request message to create a PDP context. The request message is then transmitted from a first GPRS Support Node (GSN) to a second GSN. The second GSN receives the request message and transmits a response message to the first GSN.

In another aspect, the present invention is directed to a computer-readable medium comprising instructions for avoiding hanging PDP contexts in a General Packet Radio Service network. The instructions are for including a time-out period in a request message to create a PDP context; transmitting the request message from a first GSN to a second GSN; receiving the request message in the second GSN; and transmitting a response message from the second GSN to the first GSN.

In yet another aspect, the present invention is directed to a method for avoiding hanging PDP contexts in a General Packet Radio Service network, wherein a request message to create a PDP context is transmitted from a first GSN to a second GSN. The second GSN receives the request message and transmits a response message to the first GSN. A Network Service Access Point Identifier (NSAPI) is included in the response message.

The present invention may allow the GSN to inform the GSN peer about the timeout that may be used for this particular request or, alternatively, for this particular path. The present invention may be symmetrical between the GGSN and the SGSN, although the mechanism may be more important for the GGSN.

With this information, the GSN node may adjust the timeout value accordingly and respond within time, thus avoiding problems like hanging PDP contexts, alarms etc.

Furthermore, there is a major flaw in the GTP protocol since it is not possible for the SGSN to send a Delete request whenever it receives a Create response on a non-existing PDP context. The Create response has all the information necessary to create a Delete request except for the NSAPI (Network Service Access Point Identifier). If the NSAPI had been included in the Create response, it would have been very easy to implement a mechanism that returns a Delete request and remove the hanging PDP context.

BRIEF DESCRIPTION OF THE SEVERAL VIEWS OF THE DRAWING

In the following section, the invention will be described with reference to exemplary embodiments illustrated in the attached Figures, in which.

DETAILED DESCRIPTION OF THE INVENTION

Reference will now be made in detail to exemplary embodiments of the present invention, examples of which are illustrated in the accompanying drawings.

In accordance with an exemplary embodiment of the present invention, the GTPv1 request message may be enhanced to include a timeout. Backward compatibility should not be any issue since a GSN node that does not recognize the new IE or private extension will ignore the information and use whatever timer they are using already.

This information may then be used by the GSN to be aware of when the peer GSN will no longer wait for the response. Thus, the GSN may, prior to the expiry of the timer; abort the procedure and send back a response. By responding in time, it may be possible to avoid unnecessary path failures, with hanging PDP contexts and/or alarms as a result.

Figure 1:
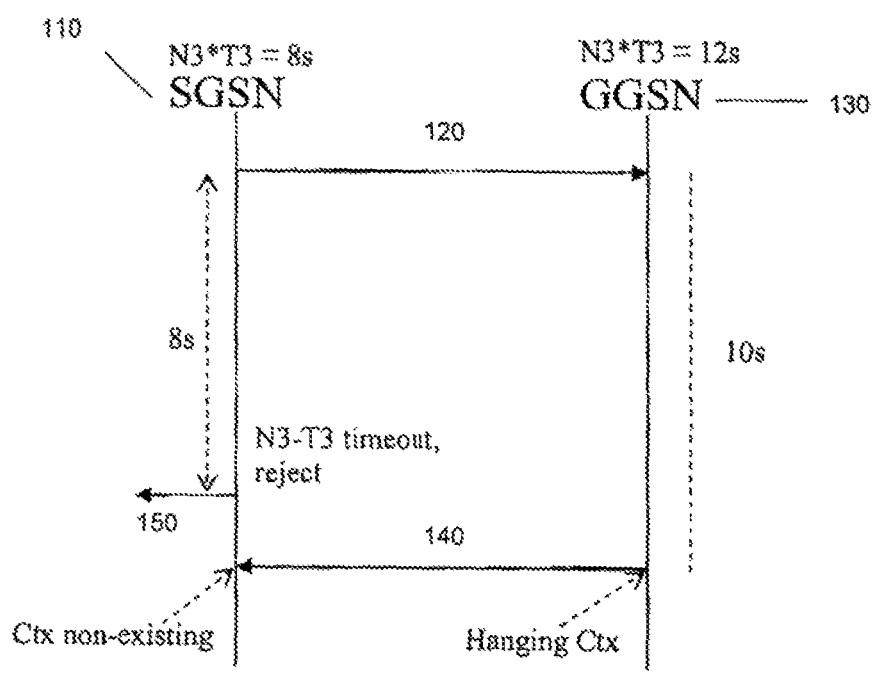
FIG. 1 illustrates a message flow between a SGSN node and a GGSN node in a N3-T3 timeout situation.
Figure 2:
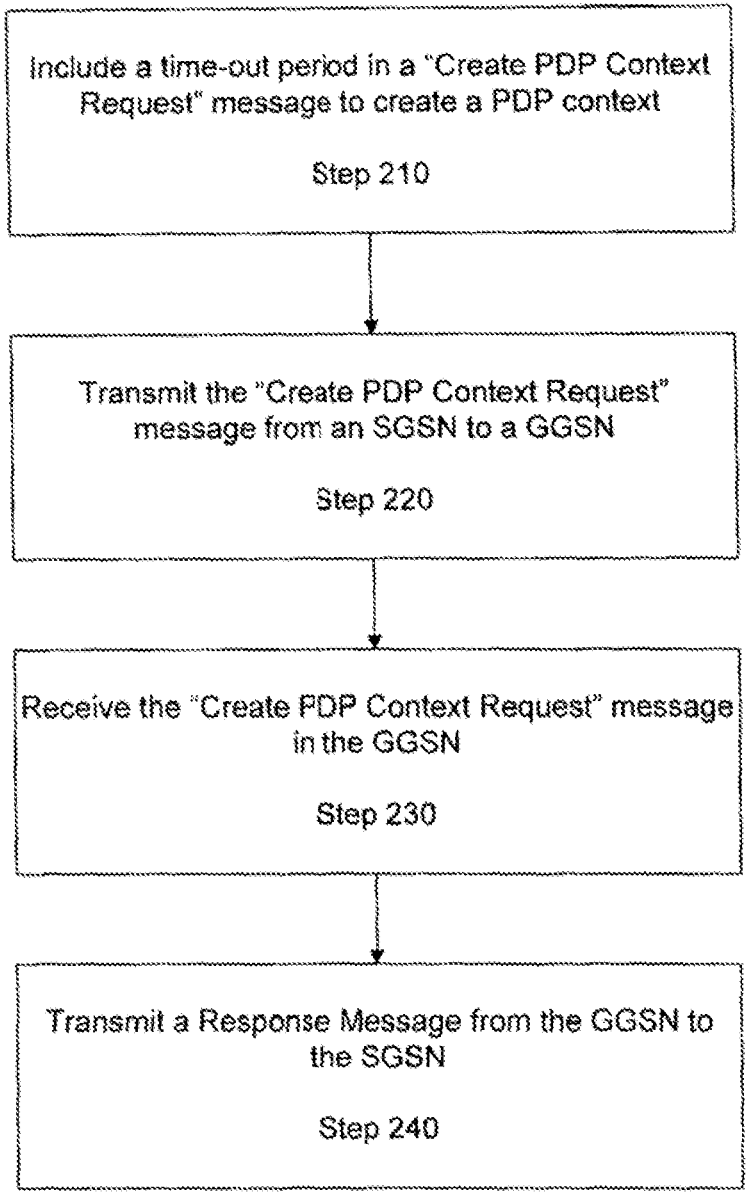
FIG. 2 illustrates a first method flowchart in accordance with an exemplary embodiment of the present invention.

FIG. 2 illustrates a first flowchart of a method in accordance with an exemplary embodiment of the present invention.

In step 210, a time-out period may be included in a request message to create a PDP context. The request message may be a Create PDP Context Request message in accordance with, for example, GTPv1. In step 220, the Create PDP Context Request message may be transmitted from a first GSN, such as an SGSN, to a second GSN, such as a GGSN. The GGSN may receive the Create PDP Context Request message in step 230 and may transmit a response message back to the SGSN in step 240. If the GGSN responds within the time-out period included in the Create PDP Context Request message, then the response message may be a Create PDP Context Response message in accordance with, for example, GTPv1. If the GGSN is unable to respond within the time-out period included in the Create PDP Context Request message, the response message from the GGSN may inform the SGSN that the creation of the PDP context has been aborted.

In accordance with another exemplary embodiment of the present invention, the GTPv1 Create response message may be enhanced to include the NSAPI by using a new IE or private extension. This may allow the receiving SGSN to send a delete request in order to remove the hanging POP context in the GGSN.

Figure 3:
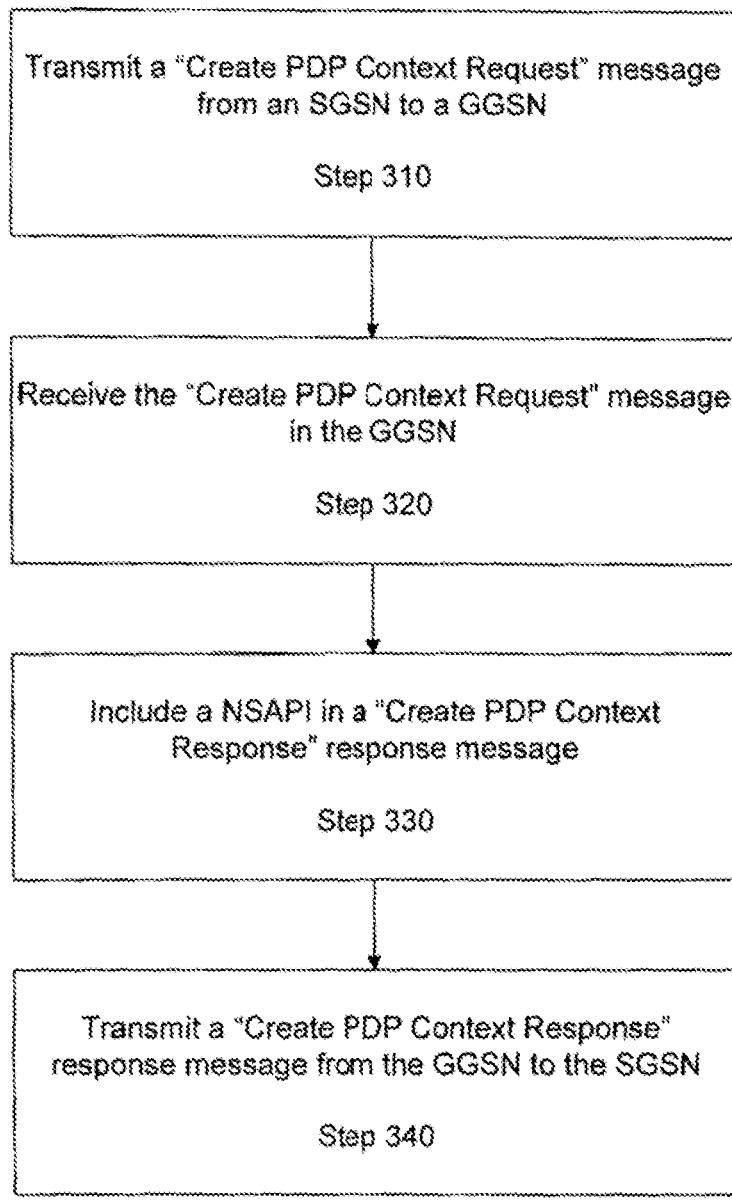
FIG. 3 illustrates a second method flowchart in accordance with an exemplary embodiment of the present invention.

FIG. 3 illustrates a second flowchart of a method in accordance with an exemplary embodiment of the present invention.

In step 310, a request message to create a PDP context is transmitted from a first GSN to a second GSN. The request message may be a Create PDP Context Request message in accordance with, for example, GTPv1. The first GSN may be an SGSN and the second GSN may be a GGSN. In step 320, the GGSN may receive the Create PDP Context Request message. The GGSN may include, in step 330, a NSAPI in a response message that is, in step 340, transmitted back to the SGSN. The response message may be a Create PDP Context Response message in accordance with, for example, GTPv1. If the GGSN transmits the Create PDP Context Response message after the N3-T3 time-out of the SGSN, then the SGSN may transmit a Delete PDP Context Request message to the GGSN, thereby deleting the hanging PDP context in the GGSN.

In further detail, according to the 3GPP TS 29.060 standard, in a Create PDP Context Response situation:

The message shall be sent from a GGSN node to a SGSN node as a response of a Create PDP Context Request. When the SGSN receives a Create PDP Context Response with the Cause value indicating 'Request Accepted', the SGSN activates the PDP context and may start to forward T-PDUs to/from the MS from/to the external data network.

The Cause value indicates if a PDP context has been created in the GGSN or not. A PDP context has not been created in the GGSN if the Cause differs from 'Request accepted'. Possible Cause values are:

"Request Accepted".
"Context not found".
"No resources available".
"All dynamic PDP addresses are occupied".
"No memory is available".
"Missing or unknown APN".
"Unknown PDP address or PDP type".
"User authentication failed".
"System failure".
"Semantic error in the TFT operation".
"Syntactic error in the TFT operation".
"Semantic errors in packet filter(s)".
"Syntactic errors in packet filters(s)".
"Mandatory IE incorrect".
"Mandatory IE missing".

"Optional IE incorrect".
"Invalid message format".
"PDP context without TFT already activated".
"APN access denied—no subscription".
"APN Restriction type incompatibility with currently active PDP Contexts"

Further, according to the standard, 'No resources available' indicates that not enough resources are available within the network to allow the PDP Context to be created. 'Missing or unknown APN' indicates e.g. when the GGSN does not support the Access Point Name. 'Unknown PDP address or PDP type' indicates when the GGSN does not support the PDP type or the PDP address.

'User authentication failed' indicates that the external packet network has rejected the service requested by the user e.g. the authentication check in the RADIUS server failed. 'PDP context without TFT already activated' indicates that a PDP context has already been activated without a TFT for that MS. 'Context not found' indicates that a Create PDP Request for a subsequent PDP context has been received, but the PDP context associated with the request, which the SGSN believes to be active does not exist on the GGSN. 'APN access denied—no subscription' indicates that the GGSN has denied the user access to an APN because a subscription is required, but the subscriber does not have the necessary subscription.

Only the Cause information element, optionally Protocol Configuration Options and optionally the Recovery information element shall be included in the response if the Cause contains another value than 'Request accepted'.

All information elements, except Recovery, Protocol Configuration Options, Charging Gateway Address, Tunnel Endpoint Identifier Control Plane and Private Extension, are mandatory if the Cause contains the value 'Request accepted'.

Additionally, in accordance with the standard, the Tunnel Endpoint Identifier for Data (I) field specifies an uplink Tunnel Endpoint Identifier for G-PDUs that is chosen by the GGSN. The SGSN shall include this Tunnel Endpoint Identifier in the GTP header of all subsequent uplink G-PDUs which are related to the requested PDP context.

The Tunnel Endpoint Identifier Control Plane field specifies an uplink Tunnel Endpoint Identifier for control plane messages, which is chosen by the GGSN. The SGSN shall include this Tunnel Endpoint Identifier in the GTP header of all subsequent uplink-control plane messages, which are related to the requested PDP context. If the GGSN has already confirmed successful assignment of its Tunnel Endpoint Identifier Control Plane to the peer SGSN, this field shall not be present. The GGSN confirms successful assignment of its Tunnel Endpoint Identifier Control Plane to the SGSN when it receives any message with its assigned Tunnel Endpoint Identifier Control Plane in the GTP header from the SGSN.

In addition to the standard, in the present invention, the GGSN may include the NSAPI received from the SGSN in the Create POP Context Request message.

According to the standard, the GGSN shall include a GGSN Address for control plane and a GGSN address for user traffic, which may differ from that provided by the underlying network service (e.g. IP).

Further, if the Create PDP Context Request received from the SGSN included IPv6 SGSN address, an IPv4/IPv6 capable GGSN shall include IPv6 addresses in the fields GGSN Address for Control Plane and GGSN Address for user traffic, and IPv4 addresses in the fields Alternative GGSN Address for Control Plane and Alternative GGSN Address for user traffic. If SGSN included IPv4 SGSN addresses in the request, an IPv4/IPv6 capable GGSN shall include IPv4 addresses in the fields GGSN Address for Control Plane and GGSN Address for user traffic, and IPv6 addresses in the fields Alternative GGSN Address for Control Plane and Alternative GGSN Address for user traffic. An IPv4/IPv6 capable SGSN shall store these GGSN Addresses and use one set of them when sending control plane on this GTP tunnel or G-PDUs to the GGSN for the MS. An IPv4 only SGSN shall not store the IPv6 address included in the Alternative GGSN Address.

If the MS requests a dynamic PDP address with the PDP Type IPv4 or IPv6 and a dynamic PDP address is allowed, then the End User Address information element shall be included and the PDP Address field in the End User Address information element shall contain the dynamic PDP Address allocated by the GGSN.

If the MS requests a static PDP address with the PDP Type IPv4 or IPv6, or a PDP address is specified with PDP Type PPP, then the End User Address information element shall be included and the PDP Address field shall not be included.

The PDP address in End User Address IE and in the Protocol configuration options IE shall be the same, if both IEs are present in the create PDP context response. When using the Secondary PDP Context Activation Procedure, the End User Address element shall not be included in the message.

The QoS values supplied in the Create PDP Context Request may be negotiated downwards by the GGSN. The negotiated values or the original values from SGSN are inserted in the Quality of Service Profile information element of the Create PDP Context Response message.

The GGSN may start to forward T-PDUs after the Create PDP Context Response has been sent. The SGSN may start to forward T-PDUs when the Create POP Context Response has been received. In this case the SGSN shall also be prepared to receive T-PDUs from the GGSN after it has sent a Create PDP Context Request but before a Create PDP Context Response has been received.

The Reordering Required value supplied in the Create PDP Context Response indicates whether the end user protocol benefits from packet in sequence delivery and whether the SGSN and the GGSN therefore shall perform reordering or not. In other words, if reordering is required by the GGSN, the SGSN and the GGSN shall perform reordering of incoming T-PDUs on this path. When the Quality of Service (QoS) Profile is Release 99 the receiving entity shall ignore the Reordering Required.

The GGSN shall include the Recovery information element into the Create PDP Context Response if the GGSN is in contact with the SGSN for the first time or the GGSN has restarted recently and the new Restart Counter value has not yet been indicated to the SGSN. The SGSN receiving the Recovery information element shall handle it as when an Echo Response message is received but shall consider the PDP context being created as active if the response indicates successful context activation at the GGSN.

The Charging ID is used to identify all charging records produced in SGSN(s) and the GGSN for this PDP context. The Charging ID is generated by the GGSN and shall be unique within the GGSN.

The Charging Gateway Address is the IP address of the recommended Charging Gateway Functionality to which the SGSN should transfer the Charging Detail Records (CDR) for this PDP Context.

The Alternative Charging Gateway Address IE has a similar purpose as the Charging Gateway Address but enables co-existence of IPv4 and IPv6 stacks in the Ga charging interfaces, without mandating any node to have a dual stack.

The format of the optional Alternative Charging Gateway Address information element is the same as the format of the Charging Gateway Address.

When both these addresses are present, the Charging Gateway address IE shall contain the IPv4 address of the Charging Gateway Function and the Alternative Charging Gateway address IE shall contain the IPv6 address of the Charging Gateway Function.

Note that the Charging Gateway Address and Alternative Charging Gateway Address may both refer to the same Charging Gateway Function.

The APN Restriction is an optional information element. In this instance it is used by the GGSN to convey to the SGSN the restriction type of the associated PDP Context being set up.

The optional Private Extension contains vendor or operator specific information.

The Protocol Configuration Options (PCO) information element may be included in the response when the GGSN provides the MS with application specific parameters or to indicate the Bearer Control Mode to the MS.

If Bearer Control Mode is provided by the GGSN in the PCO, the Bearer Control Mode IE shall be included in order to inform the SGSN about the bearer control mode and shall indicate the same bearer control mode as indicated to the MS in the PCO.

Finally, the presence of the Common Flags IE is optional. If the Prohibit Payload Compression bit of the Common Flags IE is set to 1, then for A/Gb mode access the SGSN shall not compress the payload of user data regardless of whether the user asks for payload compression. If the Prohibit Payload Compression bit of the Common Flags IE is set to 0 or the Common Flags IE is absent then the SGSN shall perform payload compression when the user asks for it as per normal operation.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method for avoiding hanging Packet Data Protocol (PDP) contexts in a General Packet Radio Service (GPRS) network, the method comprising:
    transmitting a request message to create a PDP context from a first GPRS Support Node (GSN) to a second GSN;
    receiving the request message in the second GSN;
    including a Network Service Access Point Identifier (NSAPI) in a response message;
    transmitting the response message from the second GSN to the first GSN;
    receiving the response message in the first GSN after a time-out period associated with the first GSN expires; and
    in response to receiving the response message after the time-out period associated with the first GSN expired, transmitting from the first GSN to the second GSN, a second request message, wherein the second request message is a request to delete the PDP context.

2. The method as claimed in claim 1, wherein the first GSN is a Serving GSN (SGSN), wherein the second GSN is a Gateway GSN (GGSN), wherein the request message is a Create PDP Context Request message, and wherein the response message is a Create PDP Context Response message.

3. The method as claimed in claim 1, wherein the request message and the response message are structured, transmitted, and received in accordance with GPRS Tunneling Protocol (GTP).

4. The method as claimed in claim 1, further comprising including the time-out period in the request message to create the PDP context.

5. The method as claimed in claim 4, wherein the response message from the second GSN informs the first GSN that creation of the PDP context has been aborted, if the second GSN is unable to create the PDP context within the time-out period included in the request message.

6. The method as claimed in claim 2, wherein the time-out period is a N3-T3 time-out period associated with the SGSN, and the step of transmitting a second request message includes transmitting from the SGSN to the GGSN, a Delete PDP Context Request message upon receiving the Create PDP Context Response message from the GGSN after the N3-T3 time-out period expired.

7. A method for avoiding hanging Packet Data Protocol (PDP) contexts in a General Packet Radio Service (GPRS) network, the method comprising:
    transmitting from a Serving GPRS Support Node (SGSN) to a Gateway GPRS Support Node (GGSN), a Create PDP Context Request message to create a PDP context;
    receiving the Create PDP Context Request message in the GGSN;
    including a Network Service Access Point Identifier (NSAPI) in a Create PDP Context Response message; and
    transmitting the Create PDP Context Response message from the GGSN to the SGSN;
    wherein the SGSN transmits a Delete PDP Context Request message to the GGSN, if the GGSN transmitted the Create PDP Context Response message to the SGSN after a N3-T3 time-out period associated with the SGSN had expired.

* * * * *